United States Patent
Tsai et al.

[11] Patent Number: 5,897,927
[45] Date of Patent: Apr. 27, 1999

[54] SEAL FOR VACUUM DEVICES AND METHODS FOR MAKING SAME

[75] Inventors: Kuang-Lung Tsai; Chung-Hsing Chao, both of Hsinchu; Wei-Chiang Chen, Hsin-Chu, all of Taiwan

[73] Assignee: Industrial Technology Research Institute, Hsin-Chu, Taiwan

[21] Appl. No.: 08/884,915

[22] Filed: Jun. 30, 1997

[51] Int. Cl.[6] ..................................... E06B 3/24
[52] U.S. Cl. .................. 428/34; 65/34; 65/59.1; 65/59.21; 220/2.2; 228/3.1; 228/60; 228/115
[58] Field of Search ................. 428/34; 65/34, 65/59.1, 59.21; 228/3.1, 60, 115; 220/2.2

[56] References Cited

U.S. PATENT DOCUMENTS

| | | | |
|---|---|---|---|
| 1,448,351 | 3/1923 | Kirlin | 65/34 |
| 2,704,169 | 3/1955 | Ishler et al. | 220/2.2 |
| 2,736,143 | 2/1956 | Ford | 65/102 |
| 3,027,607 | 4/1962 | Badger et al. | 65/59.26 |
| 3,215,544 | 11/1965 | O'Connell et al. | 501/15 |
| 3,420,684 | 1/1969 | Hagedorn | 501/59 |
| 3,914,000 | 10/1975 | Beckerman et al. | 445/25 |
| 4,339,482 | 7/1982 | Glaser et al. | 428/13 |
| 4,512,488 | 4/1985 | Schwenk | 220/2.2 |
| 4,713,580 | 12/1987 | Schoene | 313/624 |
| 4,770,310 | 9/1988 | Morimoto et al. | 220/2.2 |
| 5,304,890 | 4/1994 | Tsukui et al. | 313/477 |
| 5,336,287 | 8/1994 | Akimoto et al. | 65/59.5 |

*Primary Examiner*—Stanley S. Silverman
*Assistant Examiner*—Sean Vincent
*Attorney, Agent, or Firm*—George O. Saile; Stephen B. Ackerman

[57] ABSTRACT

A method for permanently sealing an ultra-high vacuum within a glass enclosure. This is accomplished by first forming a hole, either in one of the flat plates that form the enclosure or in one of the standoffs that separate the plates, and then sealing a metal tube to the glass. In one embodiment, the metal tube is positioned so as to be partly inside the hole while in another a flange at the end of the tube is positioned to cover the hole. In both cases, a glass frit paste is then applied all around the glass metal interface. This is followed by heating so that the frit softens and becomes a glass-to-metal seal. Once the structure has cooled down the attached metal tube is used as a pumping port to evacuate it and, while still under vacuum, the metal tube is pinched off to form a permanent seal.

14 Claims, 1 Drawing Sheet

SEAL FOR VACUUM DEVICES AND METHODS FOR MAKING SAME

BACKGROUND OF THE INVENTION (1) Field of the Invention

The invention relates to the general field of vacuum enclosures, more particularly to flat panel displays and methods for sealing in the vacuum.

(2) Description of the Prior Art

A considerable body of art already exists with respect to ways to seal a permanent vacuum inside a glass or metal enclosure. Most widely used is the tipping off method wherein the glass enclosure includes a tube that is an integral part of it, being either cast or blown in place during manufacture. This tube is then used as a vacuum port through which the interior of the structure is evacuated. Once the requisite level of vacuum has been achieved, the tube is heated over a small annular area well removed from the main enclosure. This heat treatment serves to soften the glass which, under the influence of atmospheric pressure, then slowly collapses until the vacuum has been sealed in place. The heat is then immediately removed to prevent further collapse and any tubing that extends beyond the seal is removed.

There are several problems associated with the tipping off method outlined above. Even though a good vacuum may have been achieved just prior to tip-off, the softening of the glass results in considerable outgassing, just as evacuation ceases, so the final permanent vacuum inside the enclosure is only of the order of $10^{-4}$ torr. In order to achieve an acceptable level of vacuum it becomes necessary to make use of a gettering procedure. While usually effective, gettering adds significantly to the overall cost of manufacturing the product.

Another problem associated with tip-off is that the glass material used is fragile. Aside from being susceptible to mechanical breakage during its life, there is also the possibility that the tip-off tube may crack during sealing if the heat is not uniformly applied. Finally, heaters that generate temperatures around 1,000° C. need to be provided for tip-off to work reliably in a production environment. Such heaters, temperature cycled many times a day, have a relatively short operating life, further adding to the manufacturing costs.

A different approach to the problem of sealing in a permanent vacuum is pinch-off. Here, the tube that is used for the vacuum port is made of metal. Once the requisite vacuum level has been achieved, the metal tube is pinched off using a suitable crimping tool. The latter is a pair of parallel jaws that press in on the tube from opposite sides. The metal is soft enough so that it deforms without cracking until the inner surfaces (of the tubing) that are being pushed together meet and then fuse as a cold weld. Provided the jaws remain parallel while the tube deforms and the inside surface of the tubing is free of grease, oxide, etc., the weld that is formed provides an effective vacuum tight seal. Any excess metal tubing is then removed.

The pinch-off method enjoys several advantages over tip-off. In particular, since no heating is involved there is no danger to the nearby glass enclosure that has been evacuated and, since outgassing is avoided, gettering is not usually needed, although it may still be used if an exceptionally high vacuum is to be maintained over a long period of time. The main problem with using pinch-off is how to achieve a reliable, low cost connection between the metal tubing that is to be pinched-off and the glass enclosure itself. In the current art, such glass to metal unions are formed by glass-to-metal seals or by housekeeper seals. These are limited to a small subset of both metal and glass types. In general, the metals are limited to OFHC copper, stainless steel 304, nickel, and gold, while the glass has been limited to Corning codes 7740 and 7052FN. A wider selection of glasses and metals has not been used because of thermal mismatch problems as well as cost.

A number of references relating to this problem can be found but none, as will be seen, anticipates the present invention. Akimoto et al. (U.S. Pat. No. 5,336,287 August 1994) describe a method for bonding metal to glass. A glass frit is used but the key feature of the invention is the inclusion of an aluminum borate whisker in the frit mix. The metal that is used is in the form of a stud that is to be bonded to the glass surface. The relative expansion coefficients of glass, metal, and frit are all carefully controlled.

Glass frit is also used by Tsukui et al. (U.S. Pat. No. 5,304,890 April 1994) to weld a reinforcing frame to a cathode ray tube while Schoene (U.S. Pat. No. 4,713,580 December 1987) teaches how a seal button may be used as part of assembling a metal vapor arc discharge lamp.

SUMMARY OF THE INVENTION

It has been an object of the present invention to provide a method for permanently sealing a vacuum within a glass enclosure.

Another object of the present invention has been that said method be low cost and well suited to mass production.

Yet another object has been that a high quality vacuum be maintained within the enclosure after sealing without the need for gettering.

A still further object has been that heating not be required as part of said method for sealing in a vacuum.

These objects have been achieved by first forming a hole, either in one of the flat plates that form the enclosure or in one of the standoffs that separate the plates, and then sealing a metal tube to the glass. In one embodiment, the metal tube is positioned so as to be partly inside the hole while in another a flange at the end of the tube is positioned to cover the hole. In both cases, a glass frit paste is then applied at the glass metal interface. This is followed by heating so that the frit softens and becomes a glass-to-metal seal. Once the structure has cooled down the attached metal tube is used as a pumping port to evacuate it and, while still under vacuum, the metal tube is pinched off to form a permanent seal.

DESCRIPTION OF THE PREFERRED EMBODIMENTS

Figure 1:
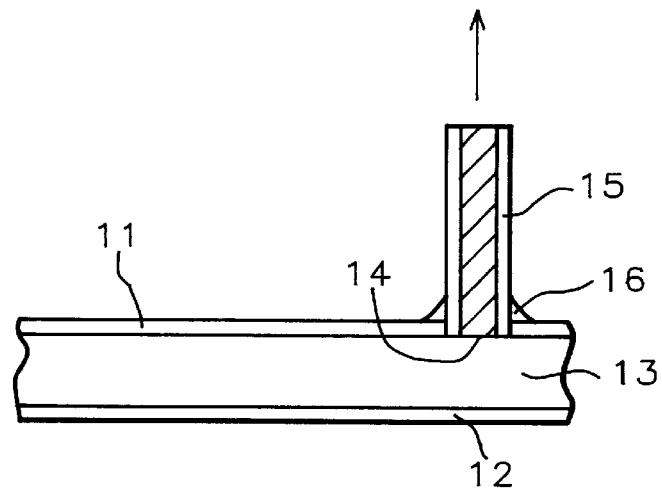
FIG. 1 shows how a metal tube may be sealed to a glass plate, so that it can serve as a pumping port which will later be pinched off.

The present invention seeks to apply the advantages of the pinch-off method to a glass structure that is to be permanently evacuated. In FIG. 1 we show a portion of a structure that includes two parallel plates of glass, 11 and 12, that form the outer surfaces of a device such as flat panel display. The various pieces that make up the display are not shown but, once these are in position between the plates, it will be necessary to evacuate the interior 13 to a high degree of vacuum (usually $10^{-7}$ torr or better) and to then permanently seal the entire structure.

In a first embodiment of the present invention, circular hole 14 is formed in one of the outer plates 11 by (for example) ultrasonic or machine drilling. Metal tube 15, held in position by a suitable jig, is positioned so as to partly lie within 14, most of it extending outwards away from 11.

Glass frit paste 16 is then applied all around the general area where tube 15 interfaces with glass sheet 11 and the full assemblage is heated so that the glass frit softens and, once the structure cools down again, 16 now serves as a glass-to-metal seal.

Using metal tube 15 as a pumping port, the structure is evacuated to whatever level of vacuum has been specified by the manufacturing process, usually between about $10^{-6}$ and $10^{-8}$ torr. The vacuum inside 13 is now permanently sealed in place using the pinch-off method described earlier and any excess metal tubing (i.e. not under vacuum) is removed.

Figure 2:
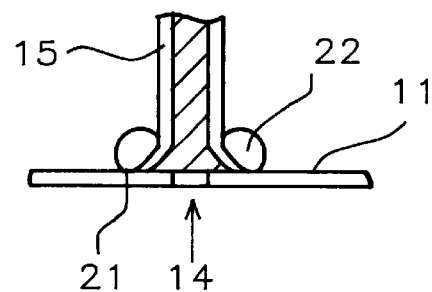
FIG. 2 shows an alternative arrangement wherein a flange is first formed at one end of the metal tube.

Referring now to FIG. 2, we show an alternative embodiment of the present invention. Hole 14 is formed in glass sheet 11 as before but, by means of a suitable tool, one end of metal tube 15 is caused to flare out and form flange 21. Tube 15 is then positioned over hole 14 so that the latter is fully covered by flange 21 and glass frit paste 22 is piled on around the flange and its interface with 11. The structure is heated as described for the first embodiment and, after softening and recooling, 22 now serves as the metal-to-glass seal. Also as in the first embodiment, the structure is pumped out through 15 and the vacuum is permanently sealed in by pinching off 15.

Figure 3:
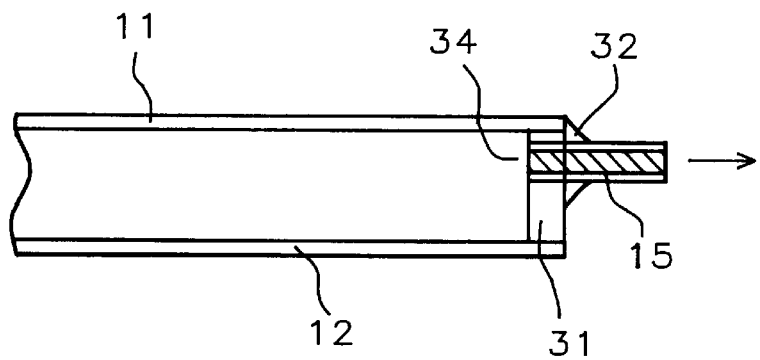
FIG. 3 shows yet another possible arrangement wherein the metal tube is sealed to one of the glass standoffs rather than to one of the glass plates.

Referring now to FIG. 3, we show slightly more detail relative to the glass enclosure that is to be evacuated. In particular, we show glass standoff 31 which is one of four such standoffs that form the side walls of the glass enclosure. These standoffs are rectangular in shape and are vacuum sealed to the outer edges of plates 11 and 12.

In a third embodiment of the present invention, metal tube 15 is attached to the enclosure at hole 34 which has been formed in the standoff rather than in one of the plates 11 or 12. As in the first embodiment, tube 15 passes through hole 34 and glass frit paste 32 is heated and softened so as to become the glass-to-metal seal.

The fourth embodiment of the present invention is a combination of the approaches illustrated in FIGS. 2 and 3. As in FIG. 3, tube 15 is attached to a standoff rather than a plate but the method of attachment involves the use of a flange as shown in FIG. 2.

As a further guide to enabling the practice of the present invention, we note the following:

For the glass used for the plates and standoffs we have preferred standoff glass, but a variety of other glass types could also be used including Corning soda lime glass 0080 and Corning glasses code 7059, 1737, or 7740. For the tubing, we have used metals such as 426 alloy or Kovar. In general, the expansion coefficient of the standoff glass might be anywhere in the range from about $8\times10^{-6}$ per °C. to $10^{-5}$ per °C. and from about $3\times10^{-6}$ per °C. to $6\times10^{-6}$ per °C. for the soda lime glass and Corning 1737 glass respectively.

For the metal tubing we have preferred tubing made of Kovar but a variety of other metals could also be used including alloy 426 and alloy 42. In general, the expansion coefficient of the metal may be anywhere in the range from about $8\times10^{-6}$ per °C. to $10^{-5}$ per °C. to from about $3\times10^{-6}$ per °C. to $6\times10^{-6}$ per °C. for alloy 426 and Kovar respectively. The metal tubing that we have used has had a preferred outside diameter of 0.5 cm. but any outside diameter between about 0.3 and 1 cm. could have been used. The thickness of the tubing walls was between about 0.1 and 1 mm. Prior to pinch-off, the interior walls of the tubing was cleaned by using dilute sulphuric acid.

The frit that we used comprised Corning 7057 or 1301 while the conditions for heating when the metal tube was sealed to the glass were a temperature between about 400 and 500° C. for between about 55 and 65 minutes in a dry air atmosphere.

While the invention has been particularly shown and described with reference to the preferred embodiments thereof, it will be understood by those skilled in the art that various changes in form and details may be made without departing from the spirit and scope of the invention.

What is claimed is:

1. A method of sealing a vacuum within a glass envelope that has an outside surface, comprising:

forming a circular hole that passes through said envelope;

positioning a metal tube to partly lie within said hole and to partly extend outwards away from said outer surface, thereby forming a glass-to-tube interface;

applying a glass frit paste all around said glass-to-tube interface:

heating the metal tube and the glass envelope so that the glass frit softens, thereby forming a glass-metal seal at said glass-to-tube interface;

allowing the metal and glass to cool to room temperature;

using the metal tube as a port, evacuating the glass envelope;

deforming the metal tube in a manner to cause pinch-off, thereby forming a vacuum tight cold yield; and removing any excess metal tubing that is not under vacuum.

2. The method of claim 1 wherein a flat panel display is located inside the glass envelope.

3. The method of claim 1 wherein the metal tube is selected from the group consisting of alloy 426, alloy 42, and Kovar.

4. The method of claim 1 wherein the step of heating the glass frit paste further comprises:

heating at a temperature between about 400 and 500° C. for between about 55 and 65 minutes in a dry air atmosphere.

5. A method of sealing a vacuum within a glass envelope that has an outside surface, comprising:

forming a circular hole that passes through said envelope;

providing a metal tube having first and second ends;

flaring out said first end to form a flat flange having an outer rim;

positioning the flange on said outer surface so as to fully surround the hole;

covering said outer rim with a glass frit paste and piling the glass frit around the flange;

heating the metal tube and the glass envelope so that the glass frit softens, thereby forming a glass-metal seal at said outer rim;

allowing the metal and glass to cool to room temperature;

using the metal tube as a port, evacuating the glass envelope;

deforming the metal tube in a manner to cause pinch-off, thereby forming a vacuum tight cold weld; and removing any excess metal tubing that is not under vacuum.

6. The method of claim 5 wherein there is a flat panel display inside the glass envelope.

7. The method of claim 5 wherein the metal tube is selected from the group consisting of alloy 426, alloy 42, and Kovar.

8. The method of claim 5 wherein the step of heating the glass frit paste further comprises:

heating at a temperature between about 400 and 500° C. for between about 55 and 65 minutes in a dry air atmosphere.

9. A vacuum tight enclosure comprising:

a pair of opposing parallel glass plates;

four rectangular glass standoffs that separate the glass plates and form the enclosure with them;

a permanent vacuum inside the enclosure; and a metal tube, vacuum sealed, by means of externally applied glass frit, at a first end to a hole in the enclosure and pinched off at a second end.

10. The enclosure of claim 9 wherein the metal tube has an outside diameter that is between about 3 and 10 mm.

11. The enclosure of claim 9 wherein the hole is located in one of the glass plates.

12. The enclosure of claim 9 wherein the hole is located in one of the standoffs.

13. The enclosure of claim 9 wherein said first end passes through said hole.

14. The enclosure of claim 9 wherein said first end is flanged and lies over said hole.

* * * * *